United States Patent
Papineni et al.

(10) Patent No.: US 11,086,883 B2
(45) Date of Patent: *Aug. 10, 2021

(54) SYSTEMS AND METHODS FOR SUGGESTING CONTENT TO A WRITER BASED ON CONTENTS OF A DOCUMENT

(71) Applicant: Google Inc., Mountain View, CA (US)

(72) Inventors: Kishore Papineni, Carmel, NY (US); Brian Kravitz, New York, NY (US); Richard Zens, New York, NY (US); Christopher Welty, New York, NY (US)

(73) Assignee: Google LLC, Mountain View, CA (US)

( * ) Notice: Subject to any disclaimer, the term of this patent is extended or adjusted under 35 U.S.C. 154(b) by 374 days.

This patent is subject to a terminal disclaimer.

(21) Appl. No.: 15/252,573

(22) Filed: Aug. 31, 2016

(65) Prior Publication Data
US 2017/0300535 A1   Oct. 19, 2017

Related U.S. Application Data

(60) Provisional application No. 62/323,155, filed on Apr. 15, 2016.

(51) Int. Cl.
*G06F 16/00* (2019.01)
*G06F 16/2457* (2019.01)
(Continued)

(52) U.S. Cl.
CPC ...... *G06F 16/24575* (2019.01); *G06F 16/248* (2019.01); *G06F 16/332* (2019.01); *G06F 16/3338* (2019.01); *G06F 16/9535* (2019.01)

(58) Field of Classification Search
CPC ......... G06F 17/30528; G06F 17/30554; G06F 17/30637; G06F 17/30672;
(Continued)

(56) References Cited

U.S. PATENT DOCUMENTS

| 7,475,344 | B1 | 1/2009 | Patil et al. |
| 8,205,155 | B2 | 6/2012 | Trotter |

(Continued)

FOREIGN PATENT DOCUMENTS

| CA | 2867547 A1 * | 4/2015 | ........... G06F 40/253 |
| WO | 2015051450 A1 | 4/2015 | |

OTHER PUBLICATIONS

PCT International Search Report and Written Opinion for International Application No. PCT/US2017/027760, dated Sep. 12, 2017, 15 pages.

(Continued)

*Primary Examiner* — Ashish Thomas
*Assistant Examiner* — Suman Rajaputra
(74) *Attorney, Agent, or Firm* — Lowenstein Sandler LLP (57) ABSTRACT

Systems and methods are described to suggest new content to a writer. An intelligent tool is initiated to obtain content of a document that is being written by an author. The intelligent tool then determines a topic of the content of the document, and identifies one or more predictive topics related to the determined topic. The one or more predictive topics are different from the topic. The intelligent tool then performs a content search based on the topic and the one or more predictive topics, and provides results from the content search to the author.

22 Claims, 10 Drawing Sheets

(51) Int. Cl.
*G06F 16/248* (2019.01)
*G06F 16/9535* (2019.01)
*G06F 16/33* (2019.01)
*G06F 16/332* (2019.01)

(58) Field of Classification Search
CPC ......... G06F 17/30867; G06F 17/30743; G06F 17/30749; G06F 17/30758; G06F 19/321; G06F 17/212; G06F 17/217; G06F 17/30905; G06F 3/0481; B07C 3/14; B42P 2261/04
See application file for complete search history.

(56) References Cited

U.S. PATENT DOCUMENTS

| | | | |
|---|---|---|---|
| 8,290,772 | B1 | 10/2012 | Cohen et al. |
| 8,904,309 | B1 | 12/2014 | Zhai et al. |
| 9,135,250 | B1 | 9/2015 | Duddu et al. |
| 9,632,994 | B2 | 4/2017 | Naim et al. |
| 2005/0102628 | A1 | 5/2005 | Salesin et al. |
| 2007/0136657 | A1 | 6/2007 | Blumenthal et al. |
| 2007/0150801 | A1 | 6/2007 | Chidlovskii et al. |
| 2008/0288862 | A1 | 11/2008 | Smetters et al. |
| 2010/0042910 | A1* | 2/2010 | Manolescu ........... G06F 17/241 715/202 |
| 2010/0138436 | A1 | 6/2010 | Gupta et al. |
| 2011/0072033 | A1 | 3/2011 | White et al. |
| 2012/0240025 | A1 | 9/2012 | Migos et al. |
| 2012/0297294 | A1 | 11/2012 | Scott et al. |
| 2012/0324350 | A1 | 12/2012 | Rosenblum et al. |
| 2013/0086031 | A1* | 4/2013 | Marantz ............. G06F 16/9038 707/706 |
| 2016/0019301 | A1* | 1/2016 | Goldenstein ......... G06F 16/248 707/722 |
| 2016/0132830 | A1 | 5/2016 | Zhang et al. |
| 2016/0147871 | A1* | 5/2016 | Kalyanpur ........... G06F 40/284 707/728 |
| 2016/0147893 | A1* | 5/2016 | Mashiach ............. G06Q 50/01 707/710 |
| 2016/0192006 | A1 | 6/2016 | Alfishawi et al. |

OTHER PUBLICATIONS

Napier Lopez; Microsoft is using AI to give Office spell-check on steriods and much more; Jul. 26, 2016; thenextweb.com; pp. 1-5.

* cited by examiner

FIG. 10

SYSTEMS AND METHODS FOR SUGGESTING CONTENT TO A WRITER BASED ON CONTENTS OF A DOCUMENT

CROSS REFERENCE

This application is a nonprovisional application of and claims priority under 35 U.S.C. 119 to U.S. Provisional Application 62/323,155, filed Apr. 15, 2016, which is herein expressly incorporated by reference.

FIELD OF THE INVENTION

In general, this disclosure relates to intelligent content search, in particular, to systems and methods for suggesting content to a writer based on content of a document.

BACKGROUND

Writers at times may look at other content when they are writing in a document. A writer can use a word processing tool to write a document, while manually searching for information and/or content via a research or search tool, such as an Internet search engine, a local database, or library. For example, when an author is writing an article about the development of space technology and considering mentioning the name Neil Armstrong, the author can enter the name "Neil Armstrong" into a search field of an Internet search engine to search for factual information such as date of birth, education, work experience, and other biographical story about the astronaut. The manual search process can be rather inefficient, as the author needs to manually type in a query, read through a list of returned search results, and then choose the information content, which can slow down the writing process.

SUMMARY

Systems and methods disclosed herein provide an intelligent tool for suggesting content to writers based on the contents of a document. An intelligent tool is initiated to obtain content of a document that is being written by an author. The intelligent tool then determines a topic of the content of the document, and identifies one or more predictive topics related to the determined topics. The one or more predictive topics are different from the topic. The intelligent tool then performs a content search based on the one or more predictive topics, and provides results from the content search to the author.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

To provide an overall understanding of the systems and methods described herein, certain embodiments will now be described, including a system and method for managing cross-referencing electronic documents stored on distributed storage servers. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

The systems and methods described herein provide an intelligent tool for suggesting content to writers based on the contents of documents. The intelligent tool may analyze the content that a writer has written so far and automatically suggest new content to the writer so that the writer can read the new content and paraphrase, or insert some part of the content into the document. The suggested content supplied by the intelligent tool may include a variety of different content types, such as but not limited to knowledge graph entities, images, websites (e.g., a URL link, etc.), tables, charts, text, outlines, other documents, videos, social media content, and/or the like. The intelligent tool may search for content from a variety of data sources such as websites, social media, public/private cloud, local/remote databases, and/or the like. The intelligent tool may perform business logics and analytics to suggest content, such as but not limited to safe search, blacklists, whitelists, turn on/off machine rewriting, and/or the like.

Figure 1:
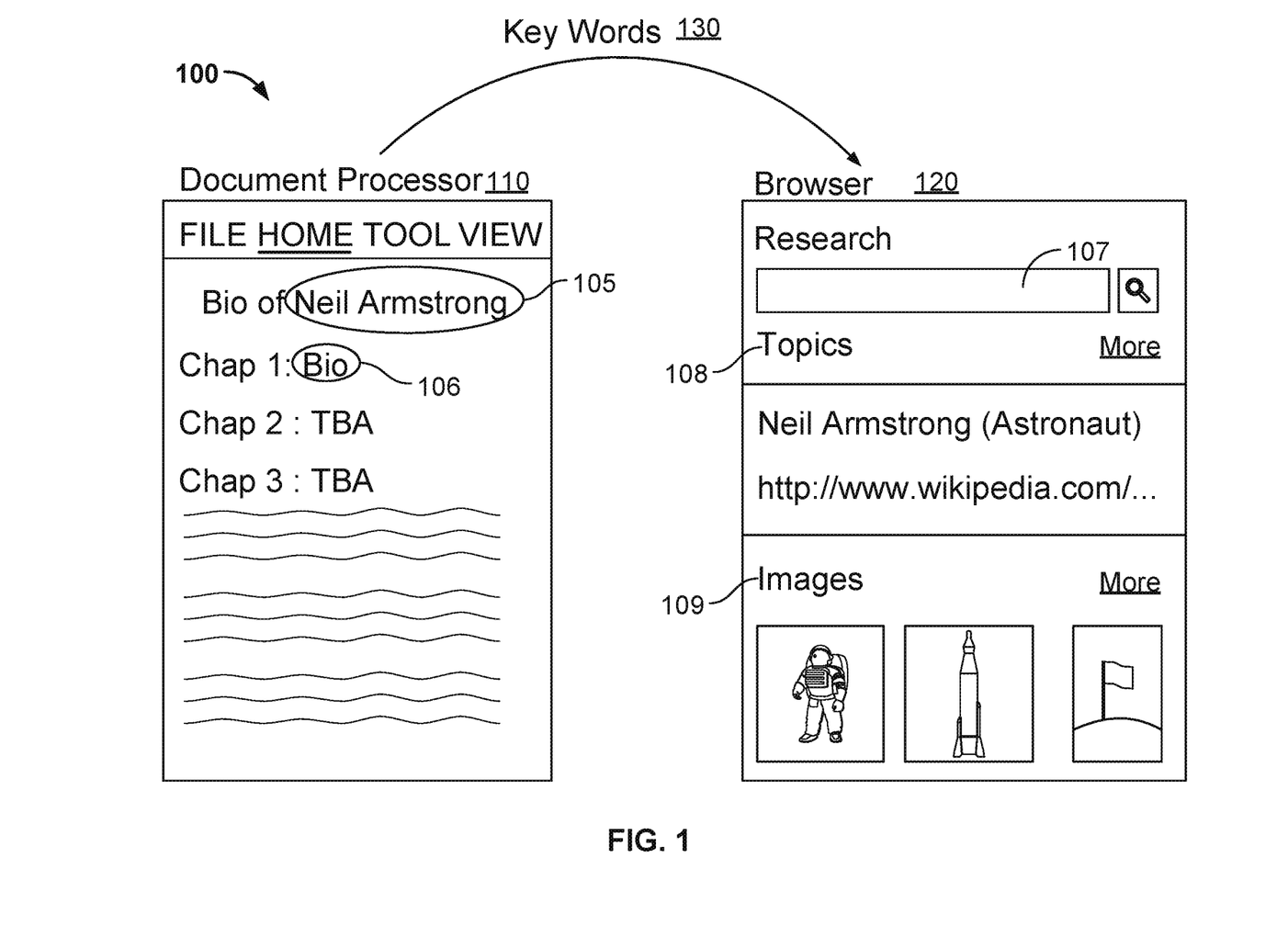
FIG. 1 provides an example block diagram 100 illustrating aspects of the intelligent tool providing suggested content based on contents being edited within a document, according to some embodiments described herein.

In some implementations, the intelligent tool may find topics, concepts or entities in a document and provide more information about them. FIG. 1 provides an example block diagram 100 illustrating aspects of the intelligent tool providing suggested content based on contents being edited within a document processor, according to some embodiments described herein. For example, when an author is writing about Neil Armstrong within a document processor 110, the author may want to find content that is relevant to the document being written. The content may include the content being written, content shared with the author, and/or any third party content from the web or other data sources, and/or the like. The author may also want to insert content into the document, which may be directly quoted or inserted, manually typed or paraphrased by the author, including manually typed originally content and/or the like. In another example, the author may want to insert links to content into the document, read more references to expand his or her knowledge of the content that is being written, and/or the like. The intelligent tool may capture key words from the content being edited such as "Neil Armstrong" 105, "biography" 106, and/or the like, and send such key words 130 to the intelligent tool for analysis. The intelligent tool may in turn automatically conduct research in the background and provide information about Neil Armstrong or related topic to the author. In this way, the intelligent tool can automatically bring the content relevant to the author's writing to the author without the author having to manually come up with search terms to conduct Internet search for his or her writing.

For example, the author may open a browser 120 and search on the Internet by entering search terms at 107 while writing. The intelligent tool may automatically search topics 108 related to the key word "Neil Armstrong" and present the search results to the author. Various types of content may be suggested, including topics 108, images 109, web sites, cloud content, social media posts, and/or the like. In other implementations, the tool may predict a related topic that the writer may be interested but has not written about yet based on a topic written in the document. For example, when the author is writing about Neil Armstrong, the intelligent tool may find other topics and articles that are possibly related to Neil Armstrong, e.g., in addition to providing Neil Armstrong's biography, the intelligent tool may provide information on Buzz Aldrin, Michael Collins, Apollo 11, history of NASA, famous space missions, Tranquility Base, and/or the like. For example, the suggested content and topics may be constantly and dynamically updated as the author writes more content, thus forming a tight write-learn-write loop.

In this way, the intelligent tool may help writers and authors to find new content automatically that is related to their document, so that no time-consuming searching is necessary. The intelligent tool may also find and suggest content that the writer may not have even known existed, content that may have been written in other languages that the user would be less likely to find with manual searching, and/or the like, and thus broaden the scope of the document. The intelligent tool may further assemble certain content that may exist only in fragments into more digestible data sources. For example, when an author is writing a paper about the world economy and population growth, the intelligent tool may aggregate data and generate one or more tables showing the evolution of gross domestic product (GDP), population, and education rates.

In another example, if the author is writing a document about "lyme disease", the intelligent tool may suggest in the browser 120 or a pane within the document processor 110 some document-external content, e.g., web passages relevant to symptoms of the disease, images of the carrier ticks, tables containing information about disease stages, the disease-causing bacteria and other relevant content from the web. The intelligent tool may include translation functionality such that the tool may search for and suggest content from different languages. In another example, the intelligent tool may automatically paraphrase content for users, and/or provide automatic citations for the inserted content, and/or the like. For example, instead of directly copy paragraphs of text from a website, the intelligent tool may paraphrase, summarize and/or highlight contents to suggest to the author. The suggested content may be automatically inserted with a reference to the original source, e.g., a hyperlink to a website, and/or the like. In another example, the intelligent tool may include reference templates such that the automatic citation may be automatically generated based on predefined formats.

Figure 2:
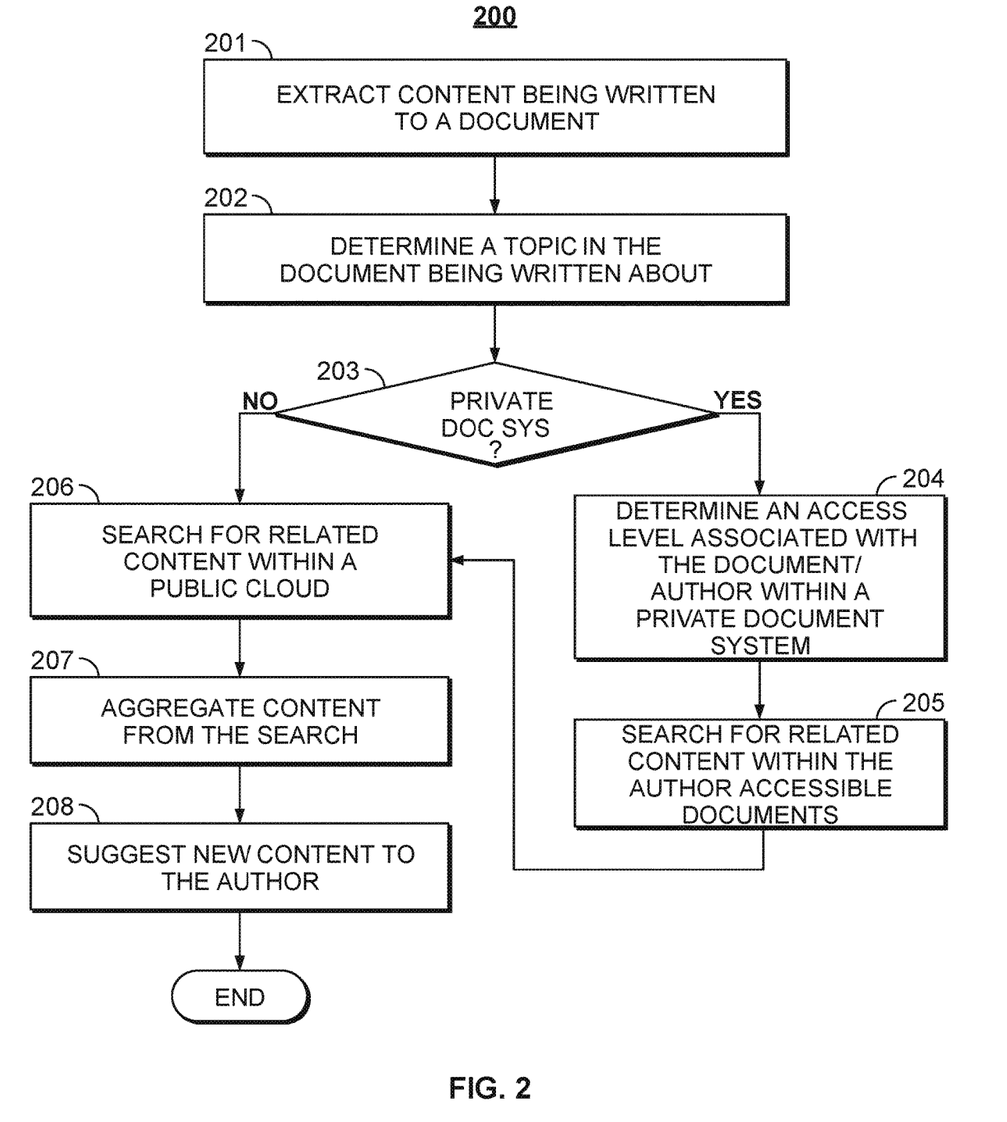
FIG. 2 provides an example logic flow diagram 100 illustrating an overall work flow for suggesting new content to an author writing on a document, according to an illustrative embodiment.

FIG. 2 provides an example logic flow diagram 100 illustrating a work flow for suggesting new content to an author writing a document, according to an implementation of the disclosure. An intelligent tool may constantly, intermittently, or periodically monitor and/or track the content of the document that an author is writing. In one implementation, the intelligent tool may launch the intelligent content search upon user request. In another implementation, the intelligent tool may automatically provide suggested content when the tool obtains results for suggesting content.

At 201, the intelligent tool may extract content being written in the document, e.g., words, phrases, sentences, data objects, metadata from graphics, etc. At 202, the intelligent tool may determine a topic from the document that the author is writing about based on the extracted content. For example, the intelligent tool may determine the context of the document, as further discussed in connection with FIG. 3.

At 203, the intelligent tool may determine whether the author has access to a private document system. For example, when the author is operating a user device within an enterprise document system, the intelligent tool may determine an access level associated with the user device to other documents on the enterprise document system, at 204. The intelligent tool may then search for related content within documents on the private system that the author has access to, at 205. For example, if the author is compiling a document relating to a business project, then the intelligent tool may suggest new content such as articles, charts, tables, paragraphs, and/or the like, from other document relating to the business project to the author.

At 206, when the author is not within a private document system or cloud, or after the private system search has been completed, the intelligent tool may search for related content within a public cloud, or publicly available source, for example, the internet. The intelligent tool may search based on a topic for the document, and/or one or more related predictive topics. Further discussion of identifying related topics can be found in connection with FIG. 3.

At 207, the intelligent tool may aggregate content from the search. At 108, the intelligent tool may suggest new content to the author. In another implementation, the suggested content may be saved for insertion or reference that can be used by the same author in the future, or by another author who is writing similar content if the other author is within a same authorized domain with the author. Example user interface diagrams and use cases for suggesting new content can be found in FIGS. 4-9.

In some implementations, the intelligent tool may identify predictive topics to a document. For example, when the author is writing an article about Neil Armstrong, if an Internet search identifies that the topic "Neil Armstrong" is often associated with "Apollo 11," the intelligent tool may identify "Apollo 11" as a predictive topic, and search for content related to "Apollo 11."

In some implementations, the intelligent tool may identify predictive topics based on feedback of the author to create a personalized experience for the author. For example, when the author is writing an article about Neil Armstrong, the intelligent tool may suggest content relating to news article about Apollo 11 and academic journal articles about astronomical physics. If the author selects and incorporates content from a news article about Apollo 11, the intelligent tool may rank content relating to Apollo 11 higher to content relating to astronomical physics, or may even remove content relating to astronomical physics from the suggested content.

Further characteristics of the intelligent tool may be presented in Table 1:

TABLE 1

Example Characteristics of Intelligent Tool

| | Intelligent Tool Research |
|---|---|
| Types of searchable content | Web Search, images, documents, Drive Content, Knowledge Graph topics, recent documents, related documents, tables, charts, books, other personal, enterprise or other organizational content (Drive, emails, chats), any previously suggested content |
| Types of suggested content | Knowledge Graph topics, images, web sites, recent documents, related documents, tables, charts, books, other personal, enterprise or other organizational content (Drive, emails, chats), and more |
| Suggestion model | Existing topics, related topics, future topics |
| Identifies most relevant sections of suggested web sites? | Yes |
| How often are suggestions updated? | Constantly, intermittently, periodically, in real time, and/or the like |
| Requires selection? | No |
| Multilingual search | Yes (data sources in different languages may be searched based on search terms in the respective language, and the search results may be automatically translated or paraphrased in the language that the author is writing in) |
| Adapts to each user's content & writing style, including adapting to content across multiple documents | Yes |

Figure 3:
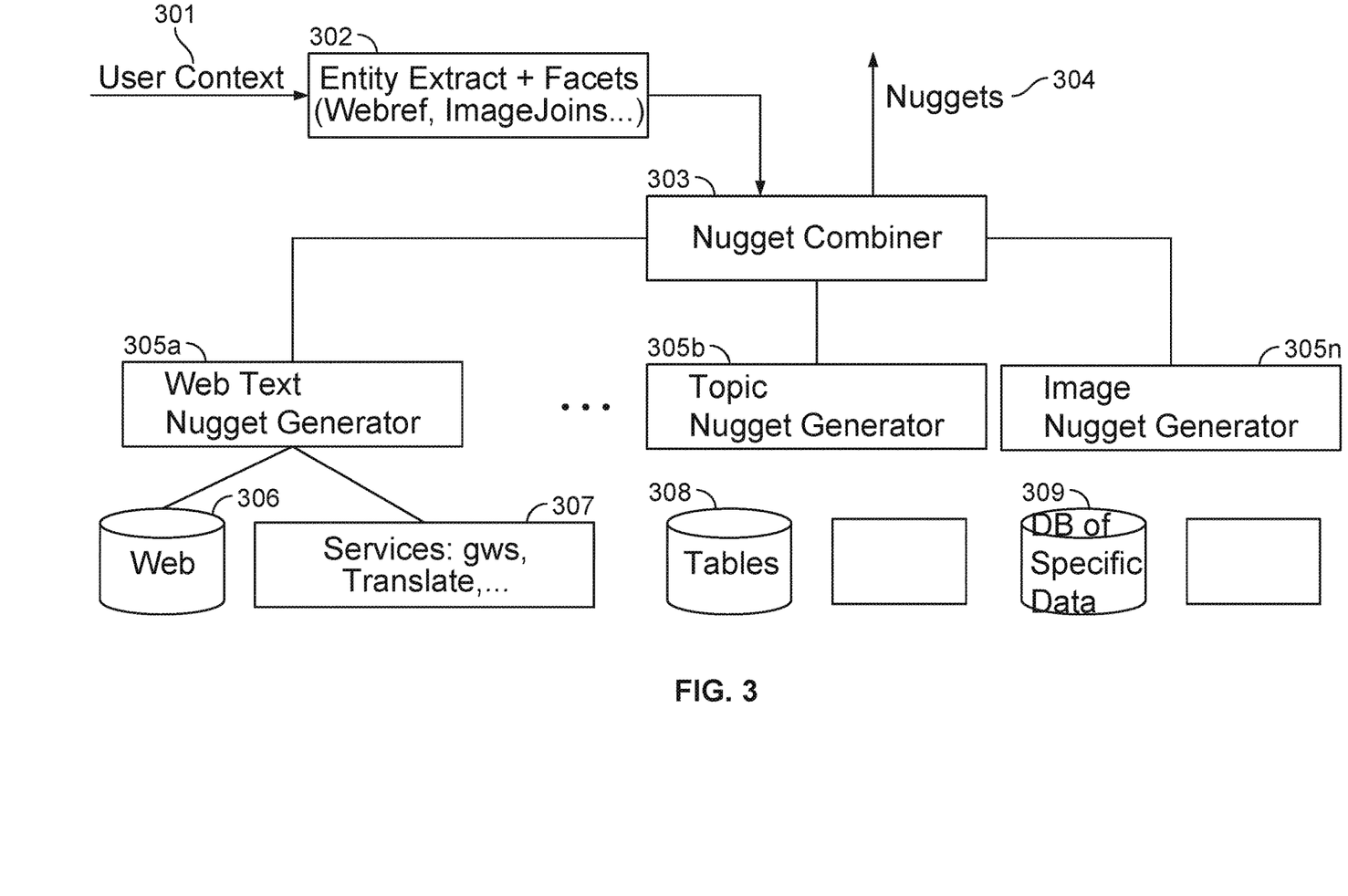
FIG. 3 provides an example flow diagram illustrating aspects of providing user context based suggested content, according to some embodiments described herein.

FIG. 3 provides an example flow diagram illustrating aspects of providing user context based suggested content, according to some embodiments described herein. The intelligent tool may act as an assistant that suggests external content (e.g., topics, text, images, tables, etc.) based on user context 301 (e.g., text, images, tables from, in docs or slides, etc.). Suggested "nuggets" of information may come from the various websites, public/private cloud, databases, and/or the like. The intelligent tool may also suggest dynamically generated content that does not necessarily already exist. For example, the intelligent tool may generate charts based on tabular content obtained from the web. The content suggestions may be dynamically updated as the document is updated.

In some implementations, the intelligent tool may predict the topics that an author may want to write next and then search the web in languages dominant for those topics. Using the user document's content, the tool scores selections from the search results to find content nuggets (e.g., passages, tables, images, etc.) and shows the top ranked nuggets (text may be translated to a language the author is writing in if different) to the author.

Different types of nuggets (e.g. text vs images) may use different types of annotations. The scoring algorithms may depend on the nugget type. For example, text nuggets may be scored to be related, but not the same as the user's document content, as the author doesn't want to see what they've already written or incorporated from the suggested nuggets; instead, they want suggestions for what to write next. In another example, image suggestions may be based on entities found in the author's document.

Thus, the intelligent tool may pass a common predictive context 301 to various different nugget generators 305a-n for different types of nuggets. For example, the intelligent tool may identify real-world entities in its input. These entities include people, places, organizations, as well as concepts like "lyme disease," "abstract expressionism," and/or the like. The tool may have different input adapters to deal with different types of input such as text and images. The intelligent tool may then look up a precomputed table of related entities, e.g., the facets. Facets of an entity include other entities that co-occur with it in some corpus (e.g., the web). The co-occurrence counts may be collected from a large number of documents on the web for entities. A facet of an entity is another entity that co-occurs with it by more than chance. Facets are the main predictive component, as these are topics that may not be present in the user context from the author's direct writing. The entities and facets 302 may be passed to a nugget combiner 303, which may distribute the entities and facet information 302 to different nugget generators 305a-n, and then combine information returned from the different nugget generators 305a-n.

For example, user document entities and their facets constitute the predictive context. Each nugget generator 305a-n may use the predictive context as it sees fit. A variety of different nugget generators may be used as shown in Table 2:

TABLE 2

Example Nugget Generators

| Generator | Data Source | Type of Suggestion |
|---|---|---|
| Web text generator | Multilingual web text | Text passages, citations |
| Image text generator | Web images | Images |
| Topics generator | Web | Entity cards |
| Table generator | Tables from the web | Tables and dynamically generated charts |
| Video Generator | Videos from the web | Videos with caption |

For example, a web text nugget generator 305a may use the multi-lingual web 306 (in a number of different languages) as its document source, and generates short "passages" (e.g., less than 320 characters or any other predefined word count limit, etc.) as suggestions. The web text nugget generator may then perform query construction, search and document retrieval, and passage scoring.

For query construction, the web text nugget generator 305a may construct web search queries using entities found in the document as well as their facets 302. Each search query may include an entity in the user document, a facet of that entity (e.g., which may or may not already exist in the document being written, etc.), and optionally other entities in the user document.

The web text nugget generator 305a may then issue search queries to a web search engine using an internal application programming interface (API). The page content of the webpages which are ranked as highest by the web search engine can then be retrieved, also using an internal API.

The web text nugget generator 305a may then split each webpage into passages, e.g., one sentence, one paragraph each, and/or the like. The passages may then be scored against user document content using text similarity. Text similarity between any two pieces of text may be computed by matching words, entities, and short phrases from one piece of text to the corresponding text in the other piece. The more matches are identified between words, entities, and short phrases, the higher the similarity score is given. If any of these passages is from a different language, a passage may be translated to the same language as the user document via an automatic machine translation service 307. In another implementation, the web text nugget generator 305a may exclude adult content when searching the web, and filter the passages from retrieved webpages for offensive content using blacklists of entities and words.

For another example, a topic nugget generator 305*b* may be used to explore content. A knowledge graph may be constructed to represent entities for which there is a reasonable amount of discourse available on the web 306, including entities in the user document and their facets.

For another example, an image nuggets generator 305*n* can be used based on the entities in the document. The image nuggets generator 305*n* constructs multiple queries to an image search engine, collating results from multiple searches. The image nuggets generator 305*n* may return the same ranking as the web search engine if there is only one search query, otherwise it may group the top result from each search, followed by the second result from each search and so on, to increase diversity among the top ranked nuggets.

In other examples, the nugget generators 305*a-n* may search specific database service such as a database of tables 308, database of specific data 309, and/or the like.

Figure 4:
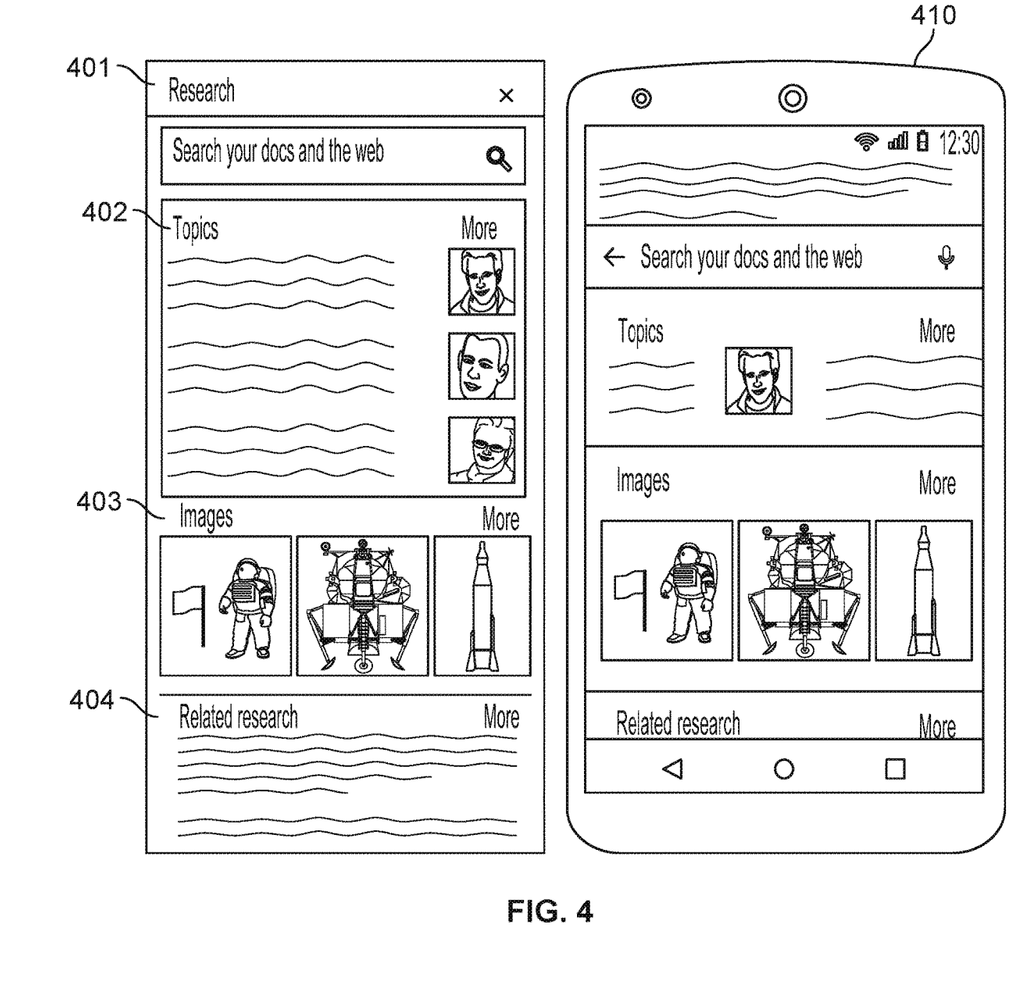
FIGS. 4-9 provide example user interface (UI) diagrams illustrating aspects of the interface of the intelligent tool, according to some embodiments described herein.

FIGS. 4-9 provide example user interface (UI) diagrams illustrating aspects of the interface of the intelligent tool, according to some embodiments described herein. In FIG. 4, the intelligent tool may initiate a zero query state such that an author does not need to manually enter any search terms to conduct research related to the content the author is writing about. For example, a Desktop research window 401 (such as a browser window) and/or a mobile research tool 410 can be launched on a computer or a mobile device, respectively, to suggest content based on the document's content. As discussed in connection with FIGS. 1-3, the intelligent tool may analyze the current document and suggest information that the user might want to write about next. For example, when the author is writing an article about Neil Armstrong, the related topics 402 including Buzz Aldrin may be recommended as the author has written about Neil Armstrong (e.g., see document processor 110 in FIG. 1), and Buzz Aldrin is considered a topic that the author should probably include in a well-written document. In addition, images 403 that relate to Apollo 11, astronaut landing on the moon, and/or the like, are considered relating to the topic "Neil Armstrong", and thus are also recommended to the author. The related research 404 panel may include links to articles and/or other web content related to the topic "Neil Armstrong."

Figure 5:
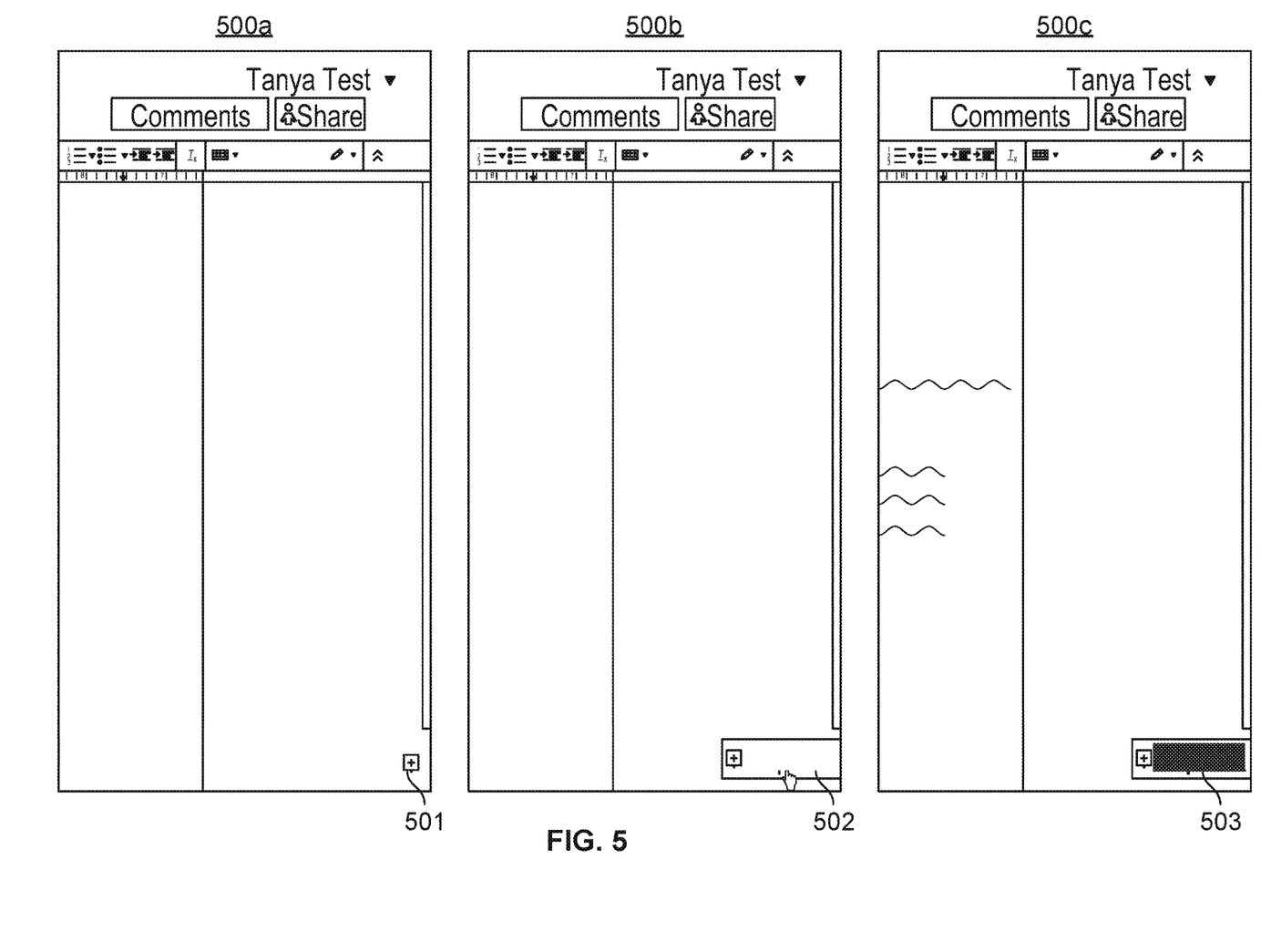

FIG. 5 shows an exemplary UI of a document processor (e.g., 110 in FIG. 1) that has launched the intelligent tool, according to some embodiments described herein. The document processor (e.g., 110 in FIG. 1) may have an interface 500*b* that has a button 502 at the bottom. When the intelligent tool is turned off, the interface 500*a* of the document processor may only display a greyed out button 501. The button 502 may have an attention-attracting mechanism (e.g., glowing, blinking, displaying in a different color, and/or the like) as shown at 503 such that the author may know that useful content is available and can then click on the button 503 to retrieve the suggested content. The button 503 may be triggered when the intelligent tool has analyzed the document content and determined that content is available.

Figure 6:
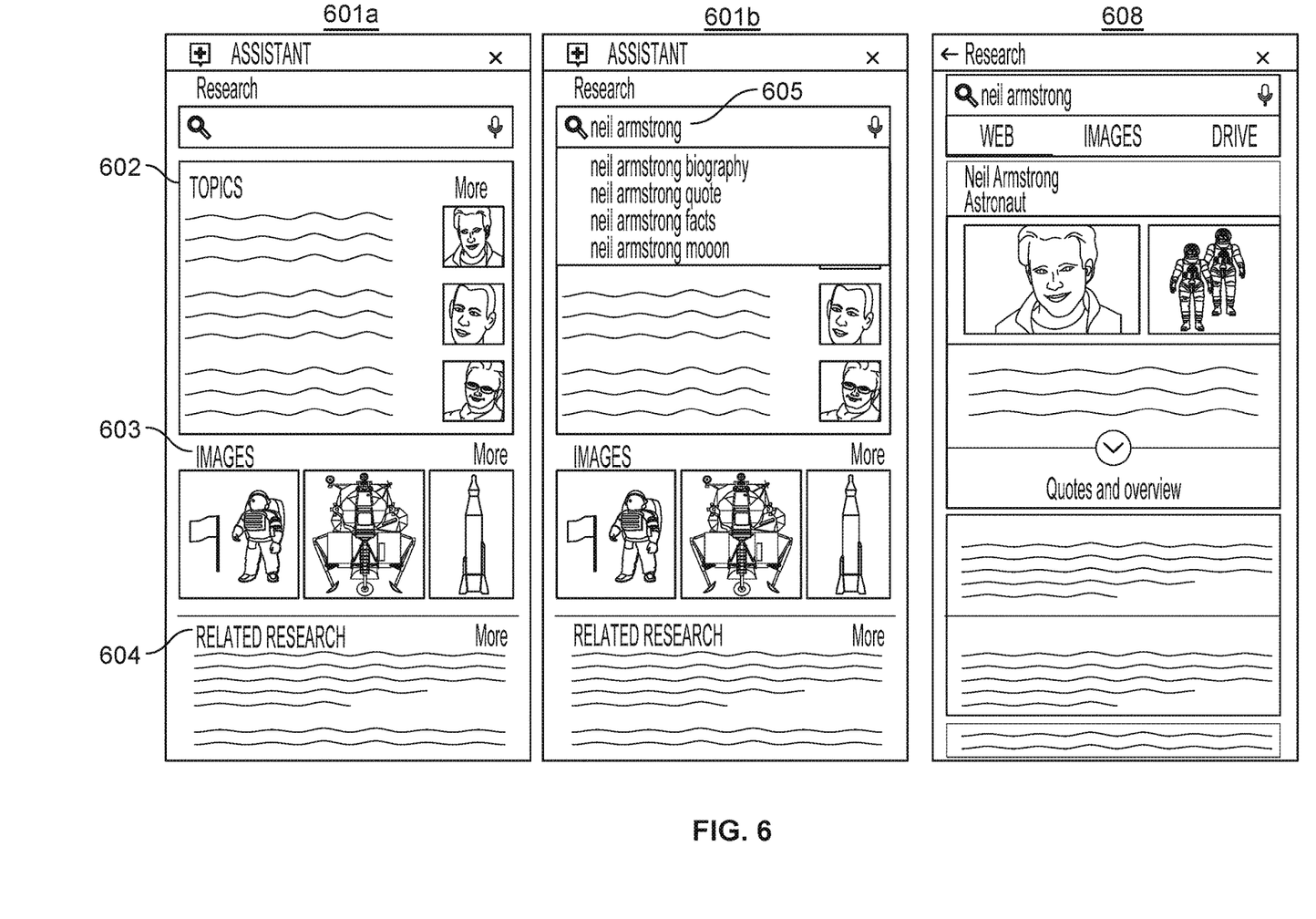

FIG. 6 shows an alternative UI for the intelligent tool. For example, an assistant UI 601*a* may be launched while the author is writing a document, which may display the suggested topics 602, images 603, related research 604 in a similar way as discussed in connection with FIG. 4. At 601*b*, tapping/clicking in the query box 605 may show historical queries, and typing in the query box may show autocompleted/suggested queries based on the content being written. At 608, by pressing enter, the research page returns web search results and shows tabs for web search results, image search results, and cloud content searches.

Figure 7:
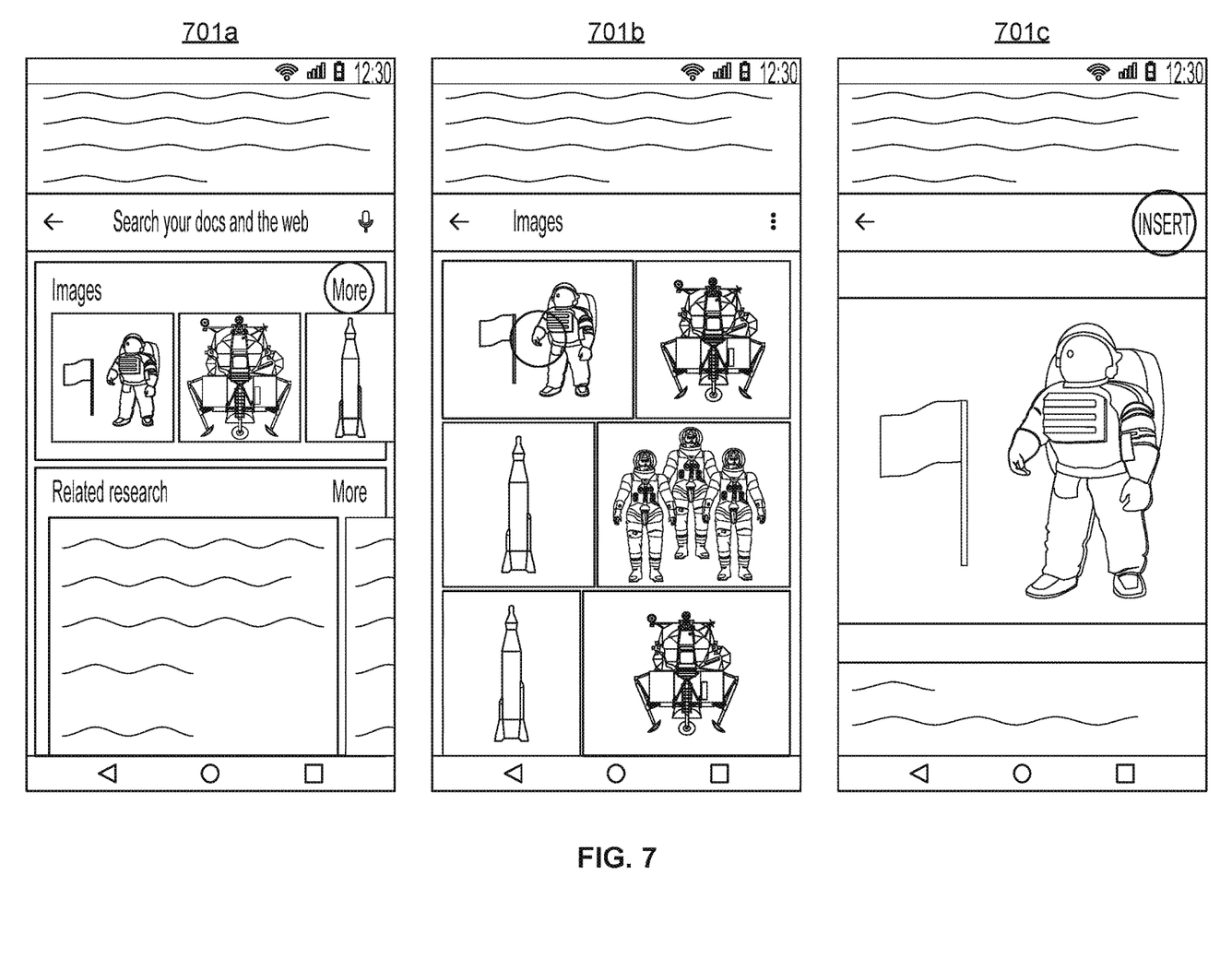
Figure 8:
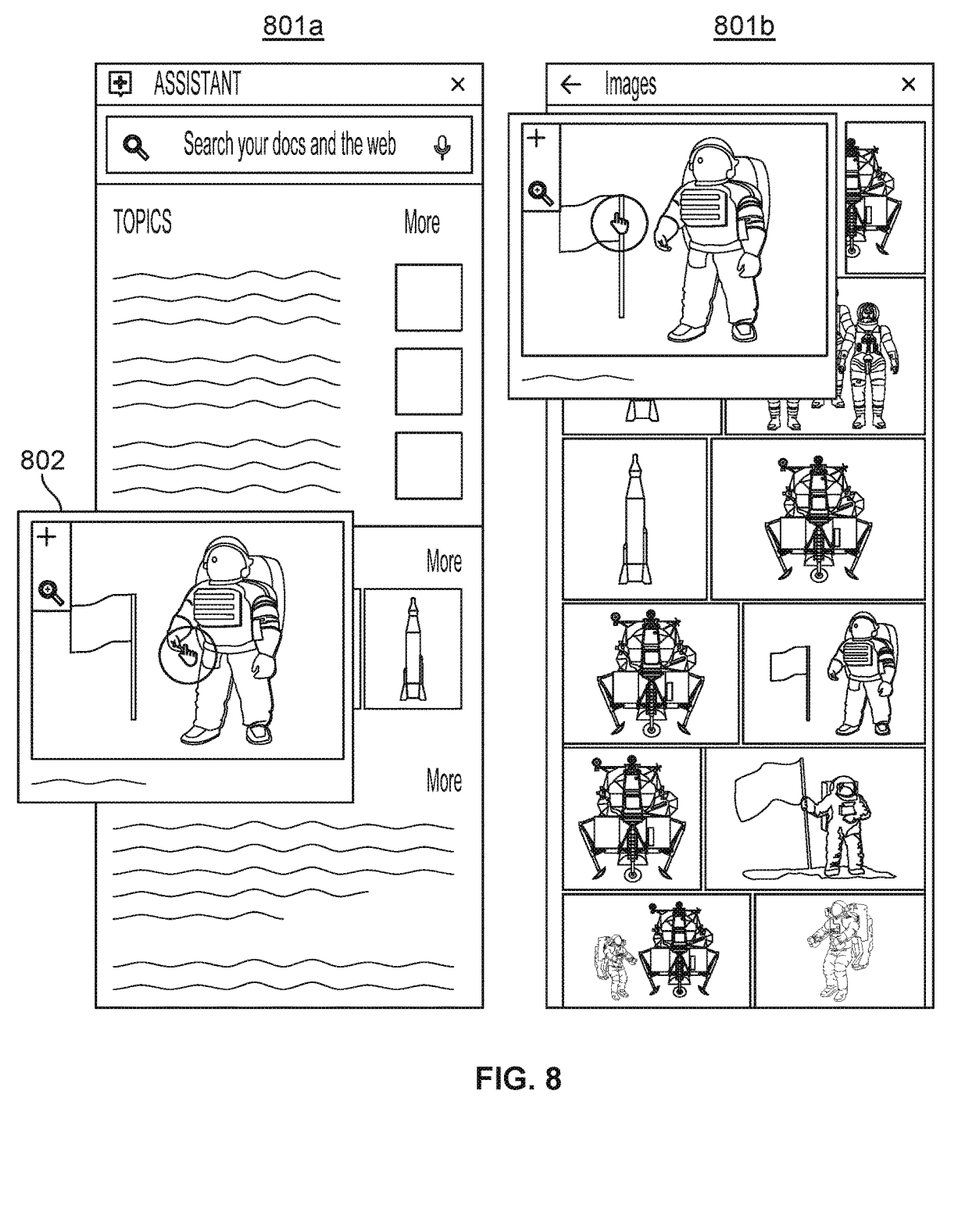

The result of clicking/tapping on piece of suggested content differs slightly by content type. As shown in FIG. 7, for example, for topics, clicking/tapping on a topic may trigger a web search for that topic at 701*a*. Tapping/clicking on an image in 701*b* may trigger an expanded image viewer 701*c* with an insert button or drag-and-drop capability. Similarly, in FIG. 8, at screen 801*a*, tapping on the image 802 may lead to an expanded image library view 801*b*.

In other examples, the intelligent tool may load the document in place (mobile), or open a new browser tab (desktop) to display the document. An author may also click/tap on a "More" field in any suggested content section to see additional suggested content. For example, options for viewing more images or viewing a specific image may be provided by the UI of intelligent tool. The author can also just tap on a single image at screen 701*a* to go straight to the viewer in the screen 701*c* in FIG. 7. In addition, the author may hover over a suggested image for an expanded view, and may also drag an image directly into the document.

Figure 9:
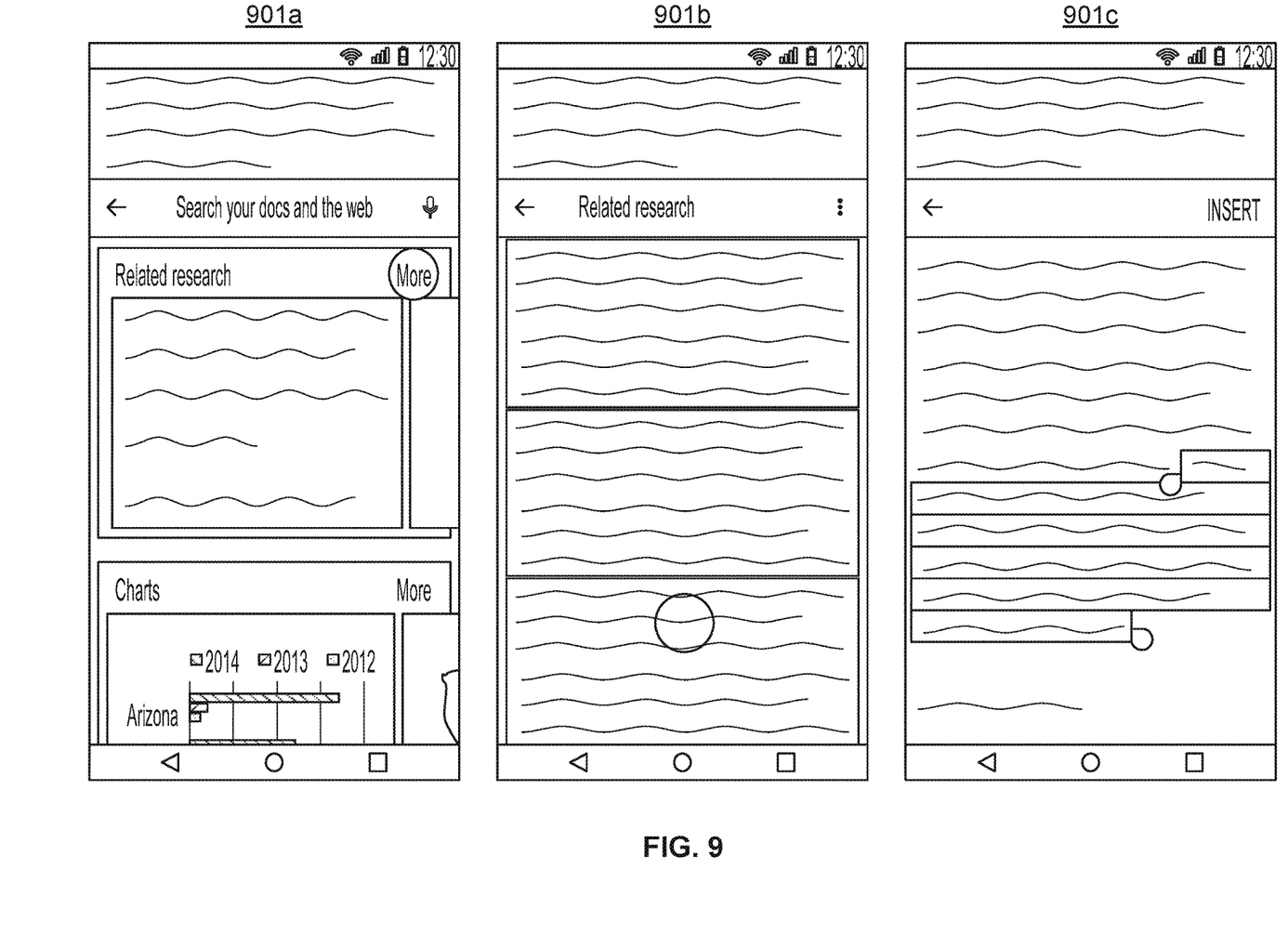

In FIG. 9, at a screen of related search 901*a*, related research may load the suggested web page 901*b* in place and select the recommended content (mobile), open a new browser tab and scroll to the recommended content (desktop), e.g., at screen 901*c*.

Figure 10:
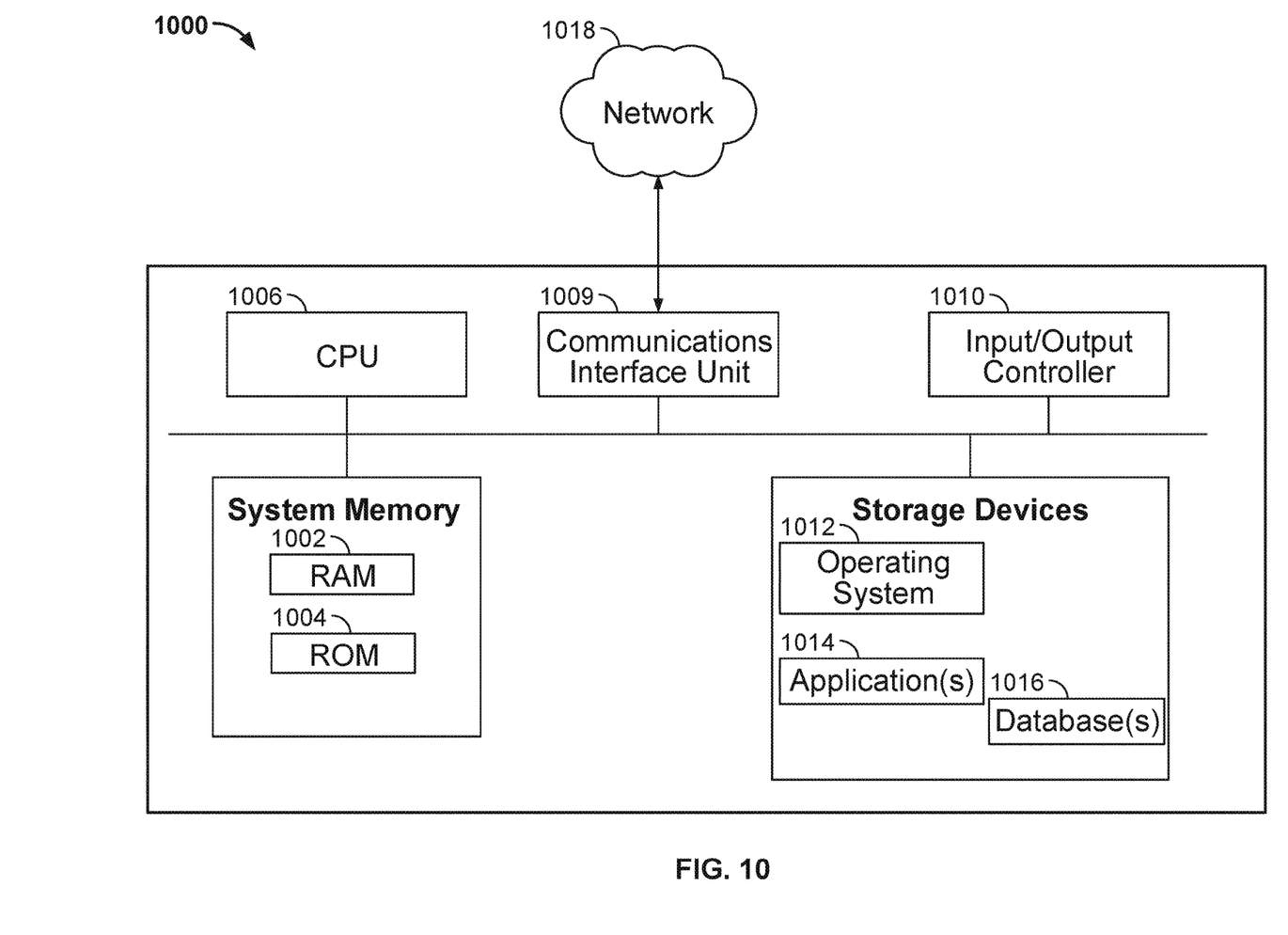
FIG. 10 is a block diagram illustrating an exemplary computer system 1000 with which the system for suggesting new content to an author and use of FIGS. 1-9 can be implemented, according to an illustrative embodiment.

FIG. 10 is a block diagram of a computing device, such as any of the components of the systems of FIGS. 1-9, for performing any of the processes described herein. Each of the components of these systems may be implemented on one or more computing devices 1000. In certain aspects, a plurality of the components of these systems may be included within one computing device 1000. In certain implementations, a component and a storage device may be implemented across several computing devices 1000.

The computing device 1000 includes at least one communications interface unit, an input/output controller 1010, system memory, and one or more data storage devices. The system memory includes at least one random access memory (RAM 1002) and at least one read-only memory (ROM 1004). All of these elements are in communication with a central processing unit (CPU 1006) to facilitate the operation of the computing device 1000. The computing device 1000 may be configured in many different ways. For example, the computing device 1000 may be a conventional standalone computer or alternatively, the functions of computing device 1000 may be distributed across multiple computer systems and architectures. Alternatively, a computer system may be virtualized to provide the functions of multiple computing devices 1000. In FIG. 10, the computing device 1000 is linked, via network or local network, to other servers or systems.

The computing device 1000 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1008 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1006 includes a processor, such as one or more conventional microprocessors and one or more supplementary co-processors such as math co-processors for offloading workload from the CPU 1006. The CPU 1006 is in communication with the communications interface unit 1008 and the input/output controller 1010, through which the CPU 1006 communicates with other devices such as other servers, user terminals, or devices. The communications interface unit 1008 and the input/output controller 1010 may include multiple communication channels for simultaneous communication with, for example, other processors, servers or client terminals.

The CPU 1006 is also in communication with the data storage device. The data storage device may include an appropriate combination of magnetic, optical or semiconductor memory, and may include, for example, RAM 1002, ROM 1004, flash drive, an optical disc such as a compact disc or a hard disk or drive. The CPU 1006 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1006 may be connected to the data storage device via the communications interface unit 1008. The CPU 1006 may be configured to perform one or more particular processing functions.

The data storage device may store, for example, (i) an operating system 1012 for the computing device 1000; (ii) one or more applications 1014 (e.g., computer program code or a computer program product) adapted to direct the CPU 1006 in accordance with the systems and methods described here, and particularly in accordance with the processes described in detail with regard to the CPU 1006; or (iii) database(s) 1016 adapted to store information that may be utilized to store information required by the program.

The operating system 1012 and applications 1014 may be stored, for example, in a compressed, an uncompiled and an encrypted format, and may include computer program code. The instructions of the program may be read into a main memory of the processor from a computer-readable medium other than the data storage device, such as from the ROM 1004 or from the RAM 1002. While execution of sequences of instructions in the program causes the CPU 1006 to perform the process steps described herein, hard-wired circuitry may be used in place of, or in combination with, software instructions for implementation of the processes of the present invention. Thus, the systems and methods described are not limited to any specific combination of hardware and software.

Suitable computer program code may be provided for performing one or more functions in relation to performing the processes as described herein. The program also may include program elements such as an operating system 1012, a database management system and "device drivers" that allow the processor to interface with computer peripheral devices (e.g., a video display, a keyboard, a computer mouse, etc.) via the input/output controller 1010.

The term "computer-readable medium" as used herein refers to any non-transitory medium that provides or participates in providing instructions to the processor of the computing device 1000 (or any other processor of a device described herein) for execution. Such a medium may take many forms, including but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1006 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1000 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, an enterprise server or group of servers, one or more desktop computers, one or more laptop computers, etc. Computer system 1000 can also be embedded in another device, for example, and without limitation, a mobile telephone, a personal digital assistant (PDA), a mobile audio player, a Global Positioning System (GPS) receiver, a video game console, and/or a television set top box.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method for suggesting new content to an author, the method comprising:
   obtaining first content of a document that is being written by the author in a first user interface presented on a screen of a user device of the author, wherein the first user interface comprises a button presented with a first visual characteristic indicating that new content related to the first content of the document is not available for viewing by the author;
   while the document is being written in the first user interface;
     performing write-learn operations as applicable to the first content of the document;
     responsive to the write-learn operations identifying the new content related to the first content of the document, causing the button in the first user interface to be presented with a second visual characteristic indicating that the new content related to the first content of the document is available for viewing by the author, wherein the write-learn operations comprise:
       (i) determining a topic of the first content of the document;
       (ii) identifying one or more predictive topics to recommend to the author to write about next, wherein the one or more predictive topics are related to the determined topic, are different from the determined topic and predict what the author is interested in writing about next; and
       (iii) performing a content search based on the determined topic and the one or more predictive topics to obtain results of the content search with higher rankings, wherein each ranking is based on a number of text similarities between content portions in the document and content portions in a respective result of the content search, and wherein the results comprise research papers related to the determined topic, and a plurality of images related to the determined topic; and
     providing the new content including the results of the content search for presentation in a second user interface on the screen of the user device of the author, the second user interface concurrently presenting (i) a first area comprising the one or more predictive topics that the author is recommended to write about next, (ii) a second area comprising the plurality of images related to the determined topic; and (iii) a third area comprising links to research papers related to the determined topic;
     wherein upon a user input selecting one of the predictive topics in the first area of the second user interface, a content search associated with the selected topic is triggered to obtain second content to be recommended to the author for addition to the first content of the document being written in the first user interface;
     wherein upon a user input selecting one of the plurality images in the second area of the second user interface, the selected image is added to the first content of the document being written in the first user interface; and
     wherein upon a user input selecting one of the links in the third area of the second user interface, at least a portion of a respective research paper is presented to the author for addition to the first content of the document being written in the first user interface.

2. The method of claim 1, wherein the one or more predictive topics are not present within the obtained content of the document.

3. The method of claim 1, wherein the content search includes a search for websites, images, links, and cloud content.

4. The method of claim 1, further comprising:
aggregating results from the content search, wherein the aggregated results are included in the second user interface presented to the author.

5. The method of claim 1, wherein the content search is performed within a private network based on an access level associated with the author to documents on the private network.

6. The method of claim 1, wherein the content search is performed within a public network or a public cloud.

7. The method of claim 1, further comprising:
generating analytical data items based on results from the content search.

8. The method of claim 1, wherein the predictive topics are determined based on terms that frequently appear with the topic.

9. The method of claim 1, wherein the content search includes searches based on a first language that the topic is frequently searched in, and translation of search results in the first language to a second language that the document is written in.

10. The method of claim 1, further comprising:
providing suggested search terms related to the topic and the one or more predictive topics within a web search engine instantiated at a browser window.

11. The method of claim 1, wherein the content portions in the document are one or more of words or phrases.

12. The method of claim 1, wherein each ranking is also based on a number of matches between entities in the document and entities in a respective result of the content search.

13. A system for suggesting new content to an author, the system comprising: a memory and a hardware processor, coupled to the memory, to: obtain first content of a document that is being written by the author in a first user interface presented on a screen of a user device of the author, wherein the first user interface comprises a button presented with a first visual characteristic indicating that new content related to the first content of the document is not available for viewing by the author; while the document is being written in the first user interface: perform write-learn operations as applicable to the first content of the document; responsive to the write-learn operations identifying the new content related to the first content of the document, cause the button in the first user interface to be presented with a second visual characteristic indicating that the new content related to the first content of the document is available for viewing by the author, wherein to perform the write-learn operations, the processor is to: (iv) determine a topic of the first content of the document; (v) identify one or more predictive topics to recommend to the author to write about next, wherein the one or more predictive topics are related to the determined topic, are different from the determined topic and predict what the author is interested in writing about next; and (vi) perform a content search based on the determined topic and the one or more predictive topics to obtain results of the content search with higher rankings, wherein each ranking is based on a number of text similarities between content portions in the document and content portions in a respective result of the content search, and wherein the results comprise research papers related to the determined topic, and a plurality of images related to the determined topic; and provide the new content including the results of the content search for presentation in a second user interface on the screen of the user device of the author, the second user interface concurrently presenting (i) a first area comprising the one or more predictive topics that the author is recommended to write about next, (ii) a second area comprising the plurality of images related to the determined topic; and (iii) a third area comprising links to research papers related to the determined topic; wherein upon a user input selecting one of the predictive topics in the first area of the second user interface, a content search associated with the selected topic is triggered to obtain second content to be recommended to the author for addition to the first content of the document being written in the first user interface; wherein upon a user input selecting one of the plurality images in the second area of the second user interface, the selected image is added to the first content of the document being written in the first user interface; and wherein upon a user input selecting one of the links in the third area of the second user interface, at least a portion of a respective research paper is presented to the author for addition to the first content of the document being written in the first user interface.

14. The system of claim 13, wherein the one or more predictive topics are not present within the obtained content of the document.

15. The system of claim 13, wherein the content search includes a search for websites, images, links, and cloud content.

16. The system of claim 13, wherein the processor is further configured to:
aggregate results from the content search, wherein the aggregated results are included in the second user interface presented to the author.

17. The system of claim 13, wherein the content search is performed within any of a private network, a public network or a public cloud, based on an access level associated with the author to documents on the private network.

18. The system of claim 13, wherein the processor is further configured to:
generate analytical data items based on results from the content search.

19. The system of claim 13, wherein the predictive topics are determined based on terms that frequently appear with the topic.

20. The system of claim 13, wherein the content search includes searches based on a first language that the topic is frequently searched in, and translation of search results in the first language to a second language that the document is written in.

21. The system of claim 13, wherein the processor is further configured to:
provide suggested search terms related to the topic and the one or more predictive topics within a web search engine instantiated at a browser window.

22. A processor-readable non-transitory storage medium storing processor-executable instructions for suggesting new content to an author, the processor-executable instructions being executed by a processor to:
obtain content of a document that is being written by the author in a first user interface presented on a screen of a user device of the author, wherein the first user interface comprises a button presented with a first visual characteristic indicating that new content related to the first content of the document is not available for viewing by the author;

while the document is being written in the first user interface;
perform write-learn operations as applicable to the first content of the document;
responsive to the write-learn operations identifying the new content related to the first content of the document, cause the button in the first user interface to be presented with a second visual characteristic indicating that the new content related to the first content of the document is available for viewing by the author, wherein to perform the write-learn operations, the processor is to:
(vii) determine a topic of the first content of the document;
(viii) identify one or more predictive topics to recommend to the author to write about next, wherein the one or more predictive topics are related to the determined topic, are different from the determined topic and predict what the author is interested in writing about next; and
(ix) perform a content search based on the determined topic and the one or more predictive topics to obtain results of the content search with higher rankings, wherein each ranking is based on a number of text similarities between content portions in the document and content portions in a respective result of the content search, and wherein the results comprise research papers related to the determined topic, and a plurality of images related to the determined topic; and provide the new content including the results of the content search for presentation in a second user interface on the screen of the user device of the author, the second user interface concurrently presenting (i) a first area comprising the one or more predictive topics that the author is recommended to write about next, (ii) a second area comprising the plurality of images related to the determined topic; and (iii) a third area comprising links to research papers related to the determined topic;
wherein upon a user input selecting one of the predictive topics in the first area of the second user interface, a content search associated with the selected topic is triggered to obtain second content to be recommended to the author for addition to the first content of the document being written in the first user interface;
wherein upon a user input selecting one of the plurality images in the second area of the second user interface, the selected image is added to the first content of the document being written in the first user interface; and
wherein upon a user input selecting one of the links in the third area of the second user interface, at least a portion of a respective research paper is presented to the author for addition to the first content of the document being written in the first user interface.

\* \* \* \* \*